(12) United States Patent
Uehara

(10) Patent No.: US 8,664,133 B2
(45) Date of Patent: *Mar. 4, 2014

(54) OPTICAL GLASS

(75) Inventor: Susumu Uehara, Sagamihara (JP)

(73) Assignee: OHARA Inc., Sagamihara-shi (JP)

( * ) Notice: Subject to any disclaimer, the term of this patent is extended or adjusted under 35 U.S.C. 154(b) by 287 days.

This patent is subject to a terminal disclaimer.

(21) Appl. No.: 13/180,947

(22) Filed: Jul. 12, 2011

(65) Prior Publication Data

US 2011/0269617 A1    Nov. 3, 2011

Related U.S. Application Data

(63) Continuation of application No. 12/351,184, filed on Jan. 9, 2009, now Pat. No. 8,030,233.

(30) Foreign Application Priority Data

Jan. 31, 2008  (JP) ................. 2008-021643

(51) Int. Cl.
*C03C 3/062* (2006.01)
*C03C 3/097* (2006.01)

(52) U.S. Cl.
USPC .................. 501/73; 501/63; 501/77; 501/78; 501/79

(58) Field of Classification Search
USPC .................... 501/63, 73, 77, 78, 79
See application file for complete search history.

(56) References Cited

U.S. PATENT DOCUMENTS

| | | | |
|---|---|---|---|
| 3,460,954 A | 8/1969 | Young | |
| 3,785,833 A | 1/1974 | Rapp | |
| 3,870,531 A | 3/1975 | Jahn | |
| 3,877,953 A | 4/1975 | Broemer et al. | |
| 4,261,751 A | 4/1981 | Nakamura et al. | |
| 4,996,173 A | 2/1991 | Tachiwana | |
| 5,952,256 A | 9/1999 | Morishita et al. | |
| 6,828,265 B2 | 12/2004 | Uehara | |
| 7,320,949 B2 | 1/2008 | Uehara | |
| 7,528,083 B2 | 5/2009 | Shimizu et al. | |
| 8,030,233 B2 * | 10/2011 | Uehara | .......... 501/73 |
| 2005/0026768 A1 | 2/2005 | Shimizu et al. | |
| 2005/0049132 A1 | 3/2005 | Shiraishi | |
| 2005/0164862 A1 | 7/2005 | Shiraishi | |
| 2007/0027016 A1 | 2/2007 | Ogino et al. | |
| 2008/0254965 A1 | 10/2008 | Ishioka | |

FOREIGN PATENT DOCUMENTS

| | | |
|---|---|---|
| CN | 1198414 A | 11/1998 |
| EP | 1 350 770 A1 | 10/2003 |
| JP | 52-25812 A | 2/1977 |
| JP | 53-016718 A | 2/1978 |
| JP | 55-051732 A | 4/1980 |
| JP | 63-265840 A | 11/1988 |
| JP | 1-219036 A | 9/1989 |
| JP | 05-270853 A | 10/1993 |
| JP | 10-265238 A | 10/1998 |
| JP | 2002-87841 A | 3/2002 |
| JP | 2004-161598 A | 6/2004 |
| WO | 01/72650 A1 | 10/2001 |
| WO | 02/14235 A1 | 2/2002 |
| WO | 2004/110942 A1 | 12/2004 |

OTHER PUBLICATIONS

Japanese Office Action dated Aug. 21, 2012, issued in corresponding Japanese patent application No. 2008-021643.
European Search Report dated Mar. 31, 2009, issued in corresponding European Patent Application No. EP 09150055.
Database WPI Week 200169, Thompson Scientific, London, GB: AN 2001-607618, XP002521895, Oct. 4, 2001.
Derwent; "Low density optical flint glass—contg. e.g. oxides of silicon, niobium, barium, zinc, sodium, potassium and titanium", Jan. 1, 1900, XP002234274.
Chinese Office Action dated Nov. 5, 2013, issued in Chinese Patent Application No. 201110260916.7 (4 pages).

* cited by examiner

*Primary Examiner* — Karl Group
*Assistant Examiner* — Elizabeth A Bolden
(74) *Attorney, Agent, or Firm* — Westerman, Hattori, Daniels & Adrian, LLP

(57) ABSTRACT

An optical glass having optical constants of a refractive index (nd) of 1.78 or over, an Abbe number (vd) of 30 or below, and a partial dispersion ratio (θg, F) of 0.620 or below comprises $SiO_2$ and $Nb_2O_5$ as essential components, wherein an amount of $Nb_2O_5$ in mass % is more than 40%. The optical glass further comprising, in mass % on oxide basis, less than 2% of $K_2O$ and one or more oxides selected from the group consisting of $B_2O_3$, $TiO_2$, $ZrO_2$, $WO_3$, ZnO, SrO, $Li_2O$ and $Na_2O$ wherein a total amount of $SiO_2$, $B_2O_3$, $TiO_2$, $ZrO_2$, $Nb_2O_5$, $WO_3$, ZnO, SrO, $Li_2O$ and $Na_2O$ is more than 90% and $TiO_2/(ZrO_2+Nb_2O_5)$ is less than 0.32.

9 Claims, No Drawings

OPTICAL GLASS

CROSS-REFERENCE TO RELATED APPLICATIONS

This is a continuation application of U.S. patent application Ser. No. 12/351,184, filed on Jan. 9, 2009, now U.S. Pat. No. 8,030,233, which claims the benefit of priority from the prior Japanese Patent Application No. 2008-021643 filed on Jan. 31, 2008, the entire contents of which are incorporated herein by references.

BACKGROUND OF THE INVENTION

This invention relates to a high refractive index, high dispersion optical glass having a refractive index (nd) of 1.78 or over, an Abbe number (vd) of 30 or below, and a partial dispersion ratio (θg, F) of 0.620 or below. This invention relates also to optical elements such as lenses and prisms obtained by using this optical glass.

There is a large demand for a high refractive index, high dispersion optical glass as a material for optical elements such as lenses of various types. As optical glasses having a refractive index (nd) of 1.78 or over and an Abbe number (vd) of 30 or below, known in the art are glass compositions disclosed by Japanese Patent Application Laid-open Publication Nos. Sho 52-25812 and 2004-161598, and WO2004/110942.

An optical system using such optical glass is mounted on an optical product such as a digital camera. For improving chromatic aberration in such optical glass, it is desired for the optical glass of a high refractive, high dispersion region to have a relatively small partial dispersion ratio.

For this reason, from the standpoint of utility in optical design, there has been a strong demand for an optical glass having high refractive index, high dispersion characteristics and a small partial dispersion ratio.

Particularly, a high refractive index, high dispersion optical glass having a refractive index (nd) of 1.78 or over and an Abbe number (vd) of 30 or below is strongly desired for.

The above mentioned publications satisfy the above described refractive index and Abbe number. The optical glasses disclosed specifically in these publications, however, do not satisfy conditions that the glass comprises $SiO_2$ and $Nb_2O_5$ as essential components, wherein an amount of $Nb_2O_5$ in mass % is more than 40%, and further comprises, in mass % on oxide basis, less than 2% of $K_2O$ and one or more oxides selected from the group consisting of $B_2O_3$, $TiO_2$, $ZrO_2$, $WO_3$, $ZnO$, $SrO$, $Li_2O$ and $Na_2O$ wherein a total amount of $SiO_2$, $B_2O_3$, $TiO_2$, $ZrO_2$, $Nb_2O_5$, $WO_3$, $ZnO$, $SrO$, $Li_2O$ and $Na_2O$ is more than 90% and $TiO_2/(ZrO_2+Nb_2O_5)$ is less than 0.32.

In an optical system for a digital camera, a spherical lens is generally used. A spherical lens is produced by heating and forming a lens preform material by using a mold having a shape which is closely similar to the shape of the lens, and polishing the obtained lens preform material. In a high refractive index, high dispersion optical glass, devitrification tends to occur during forming of the lens preform material by heating (reheat press molding) and, therefore, an optical glass which has a high resistance to devitrification is desired for.

On the other hand, for correcting spherical surface aberration, an aspherical lens is useful. As a method for producing an aspherical lens cheaply, precision press molding is known. The precision press molding is a method according to which glass for a lens preform material is heated and thereby softened and a high precision mold surface is transferred to the glass by pressing the mold. Since the mold is exposed to a high temperature environment, the forming surface of the mold tends to be oxidated and eroded or a release film provided on the surface of the forming surface of the mold tends to be damaged and the high precision forming surface of the mold thereby cannot be maintained or the mold itself tends to be damaged. In such a case, the mold must be exchanged with the result that frequency of exchange of the mold increases and a large scale production of the lens preform material at a low cost becomes difficult. For this reason, from the standpoint of preventing such damage to the mold, maintaining a high precision forming surface of the mold for a long period of time and enabling precision press molding at a low pressing force, it is desired for an optical glass for a lens preform material to have as low a glass transition temperature (Tg) as possible.

SUMMARY OF THE INVENTION

It is, therefore, an object of the invention to provide an optical glass which comprehensively eliminates the above described disadvantages of the prior art optical glasses and has the above described optical constants and a small partial dispersion ratio.

As a result of studies and experiments, the inventor of the present invention has found, which has led to the present invention, that an optical glass having the above described optical constants and a small partial dispersion ratio can be obtained by adding a specific amount of $SiO_2$ and $Nb_2O_5$ to the glass.

For achieving the above described object of the invention, in the first aspect of the invention, there is provided an optical glass having optical constants of a refractive index (nd) of 1.78 or over, an Abbe number (vd) of 30 or below, and a partial dispersion ratio (θg, F) of 0.620 or below, and comprising $SiO_2$ and $Nb_2O_5$ as essential components, wherein an amount of $Nb_2O_5$ in mass % is more than 40%.

In the second aspect of the invention, there is provided an optical glass as defined in the first aspect further comprising, in mass % on oxide basis, less than 2% of $K_2O$ and one or more oxides selected from the group consisting of $B_2O_3$, $TiO_2$, $ZrO_2$, $WO_3$, $ZnO$, $SrO$, $Li_2O$ and $Na_2O$ wherein a total amount of $SiO_2$, $B_2O_3$, $TiO_2$, $ZrO_2$, $Nb_2O_5$, $WO_3$, $ZnO$, $SrO$, $Li_2O$ and $Na_2O$ is more than 90% and $TiO_2/(ZrO_2+Nb_2O_5)$ is less than 0.32.

In the third aspect of the invention, there is provided an optical glass as defined in the first or second aspect comprising, in mass % on oxide basis,

| | |
|---|---|
| $SiO_2$ | 10-40% |
| $Nb_2O_5$ | more than 40% up to 65% and |
| $B_2O_3$ | 0-20% and/or |
| $GeO_2$ | 0-10% and/or |
| $Al_2O_3$ | 0-10% and/or |
| $TiO_2$ | 0-15% and/or |
| $ZrO_2$ | 0-15% and/or |
| $WO_3$ | 0-15% and/or |
| $ZnO$ | 0-15% and/or |
| $SrO$ | 0-15% and/or |
| $Li_2O$ | 0-15% and/or |
| $Na_2O$ | 0-20% and/or |
| $Sb_2O_5$ | 0-1%. |

In the fourth aspect of the invention, there is provided an optical glass as defined in any of the first to third aspects comprising, in mass % on oxide basis,

| | |
|---|---|
| $Gd_2O_3$ | 0-10% and/or |
| $Y_2O_3$ | 0-10% and/or |
| MgO | 0-15% and/or |
| CaO | 0-15% and/or |
| BaO | 0-15% and/or |
| $Ga_2O_3$ | 0-10% and/or |
| $CeO_2$ | 0-10% and/or |
| $TeO_2$ | 0-10% and/or |
| $Bi_2O_3$ | 0-10%. |

In the fifth aspect of the invention, there is provided an optical glass as defined in any of the first to fourth aspects having a glass transition point (Tg) of 650° C. or below.

In the sixth aspect of the invention, there is provided a lens preform material made of an optical glass as defined in any of the first to fifth aspects.

In the seventh aspect of the invention, there is provided a lens preform material for mold pressing made of an optical glass as defined in any of the first to sixth aspect.

In the eighth aspect of the invention, there is provided an optical element made of an optical glass as defined in any of the first to seventh aspects.

DESCRIPTION OF PREFERRED EMBODIMENTS

Preferred embodiments of the invention will now be described.

Description will be made about respective components of the optical glass of the present invention. Unless otherwise described, amounts of the respective components indicate mass % calculated on oxide basis.

In the optical glass of the invention, $SiO_2$ is an essential component as a glass forming oxide and it is also effective for increasing viscosity of the glass and improving resistance to devitrification and chemical durability. If the amount of this component is insufficient, these effects cannot be performed sufficiently and, if the amount of this component is excessive, resistance to devitrification and melting property of the glass are deteriorated rather than improved. The lower limit of the amount of this component preferably is 10%, more preferably 12% and most preferably 14% and the upper limit of the amount of this component is preferably 40%, more preferably 35% and most preferably 30%.

$SiO_2$ may be introduced in the glass by using, e.g., $SiO_2$ as a raw material.

$B_2O_3$ is an optional component which functions as a glass forming oxide and is also effective for reducing glass transition point (Tg). If the amount of this component is excessive, chemical durability tends to be deteriorated. Therefore, the upper limit of the amount of this component is preferably 20%, more preferably 15% and most preferably 10%.

$B_2O_3$ may be introduced into the glass by using, e.g., $H_3BO_3$ and $B_2O_3$ as raw materials.

$GeO_2$ is an optional component which is effective for increasing refractive index and improving resistance to devitrification. It also functions as a glass forming oxide. If the amount of this component is excessive, the cost of the optical glass becomes high since $GeO_2$ is a very expensive material. Therefore, the upper limit of the amount of this component is preferably 10%, more preferably 5% and most preferably 3%.

$GeO_2$ may be introduced into the glass by using, e.g., $GeO_2$ as a raw material.

$Al_2O_3$ is an optional component which is effective for improving chemical durability. If the amount of this component is excessive, resistance to devitrification tends to be deteriorated. Therefore, the upper limit of the amount of this component is preferably 10%, more preferably 5% and most preferably 3%.

$Al_2O_3$ may be introduced into the glass by using, e.g., $Al_2O_3$ and $Al(OH)_3$.

$TiO_2$ is effective for increasing refractive index and dispersion. If the amount of this component is excessive, transmittance in the visible ray short wavelength region is deteriorated and partial dispersion ratio also is increased. Therefore, the upper limit of the amount of this component is preferably 15%, more preferably 12% and most preferably 9%. Since $TiO_2$ is an optional component, the glass of the present invention can be produced without this component. For performing the above described effects of this component sufficiently, however, the lower limit of this component is preferably more than 0%, more preferably 0.1% and most preferably 1%.

$TiO_2$ may be introduced into the glass by using, e.g., $TiO_2$ as a raw material.

$ZrO_2$ is effective for increasing refractive index and decreasing of partial dispersion ratio and improving chemical durability. If the amount of this component is excessive, resistance to devitrification is deteriorated. Therefore, the upper limit of the amount of this component is preferably 15%, more preferably 13% and most preferably 12%. Since $TiO_2$ is an optional component, the glass of the present invention can be produced without this component. For performing the above described effects of this component sufficiently, however, the lower limit of this component is preferably more than 0%, more preferably 0.1% and most preferably 1%.

$ZrO_2$ may be introduced into the glass by using, e.g., $ZrO_2$ as a raw material.

$Nb_2O_5$ is an essential component for increasing refractive index and dispersion while reducing partial dispersion ratio and also for improving resistance to devitrification and chemical durability. If the amount of this component is insufficient, these effects cannot be performed sufficiently and, if the amount of this component is excessive, resistance to devitrification of the glass is deteriorated rather than improved and transmittance in the visible ray short wavelength region is also deteriorated. The lower limit of the amount of this component preferably is more than 40%, more preferably 41% and most preferably 42% and the upper limit of the amount of this component is preferably 65%, more preferably 60% and most preferably 56%.

$Nb_2O_5$ may be introduced in the glass by using, e.g., $Nb_2O_5$ as a raw material.

$Sb_2O_3$ may be optionally added for defoaming during melting of the glass. If the amount of this component is excessive, transmittance in the visible ray short wavelength region is deteriorated. Therefore, the upper limit of the amount of this component is preferably 1%, more preferably 0.5% and most preferably 0.2%.

$Ta_2O_5$ is effective for increasing refractive index and improving chemical durability and resistance to devitrification. If the amount of this component is excessive, resistance to devitrification is deteriorated rather than improved. Therefore, the upper limit of the amount of this component is preferably 15%, more preferably 12% and most preferably 10%.

$Ta_2O_5$ may be introduced into the glass by using, e.g., $Ta_2O_5$ as a raw material.

$WO_3$ is effective for adjusting optical constants and improving resistance to devitrification. If the amount of this component is excessive, resistance to devitrification is deteriorated rather than improved and transmittance in the visible ray short wavelength region is deteriorated and partial dispersion ratio is increased. Therefore, the upper limit of the amount of this component is preferably 15%, more preferably 12% and most preferably 10%.

$WO_3$ may be introduced into the glass by using, e.g., $WO_3$ as a raw material.

$La_2O_3$ is effective for increasing refractive index. If the amount of this component is excessive, resistance to devitrification is deteriorated and it becomes difficult to provide the glass with a high dispersion characteristic. Therefore, the upper limit of the amount of this component is preferably 10%, more preferably 5% and most preferably 3%.

$La_2O_3$ may be introduced into the glass by using, e.g., $La_2O_3$, lanthanum nitratge or its hydrate as a raw material.

$Gd_2O_3$ is effective for increasing refractive index. If the amount of this component is excessive, resistance to devitrification is deteriorated and it becomes difficult to provide the glass with a high dispersion characteristic. Therefore, the upper limit of the amount of this component is preferably 10%, more preferably 5% and most preferably 3%.

$Gd_2O_3$ may be introduced into the glass by using, e.g., $Gd_2O_3$ as a raw material.

$Yb_2O_3$ is effective for increasing refractive index. If the amount of this component is excessive, resistance to devitrification and chemical durability are deteriorated and it becomes difficult to provide the glass with a high dispersion characteristic. Therefore, the upper limit of the amount of this component is preferably 10%, more preferably 5% and most preferably 3%.

$Yb_2O_3$ may be introduced into the glass by using, e.g., $Yb_2O_3$ as a raw material.

$Y_2O_3$ is effective for increasing refractive index. If the amount of this component is excessive, resistance to devitrification is deteriorated and it becomes difficult to provide the glass with a high dispersion characteristic. Therefore, the upper limit of the amount of this component is preferably 10%, more preferably 5% and most preferably 3%.

$Y_2O_3$ may be introduced into the glass by using, e.g., $Y_2O_3$ as a raw material.

ZnO is effective for reducing glass transition temperature (Tg) and improving chemical durability. If the amount of this component is excessive, resistance to devitrification is deteriorated. Therefore, the upper limit of the amount of this component is preferably 15%, more preferably 10% and most preferably 5%.

ZnO may be introduced into the glass by using, e.g., ZnO as a raw material.

MgO is effective for adjusting optical constants. If the amount of this component is excessive, resistance to devitrification is deteriorated. Therefore, the upper limit of the amount of this component is preferably 15%, more preferably 10% and most preferably 5%.

MgO may be introduced into the glass by using, e.g., MgO or its carbonate, nitrate or hydroxide as a raw material.

CaO is effective for adjusting optical constants. If the amount of this component is excessive, resistance to devitrification is deteriorated. Therefore, the upper limit of the amount of this component is preferably 15%, more preferably 10% and most preferably 5%.

CaO may be introduced into the glass by using, e.g., CaO or its carbonate, nitrate or hydroxide as a raw material.

SrO is effective for adjusting optical constants. If the amount of this component is excessive, resistance to devitrification is deteriorated. Therefore, the upper limit of the amount of this component is preferably 15%, more preferably 10% and most preferably 5%.

SrO may be introduced into the glass by using, e.g., SrO or its carbonate, nitrate or hydroxide as a raw material.

BaO is effective for adjusting optical constants. If the amount of this component is excessive, resistance to devitrification is deteriorated. Therefore, the upper limit of the amount of this component is preferably 15%, more preferably 10% and most preferably 5%.

BaO may be introduced into the glass by using, e.g., BaO or its carbonate, nitrate or hydroxide as a raw material.

$Li_2O$ is effective for reducing partial dispersion ratio, for decreasing glass transition temperature (Tg) largely, and for enhancing melting of glass raw materials. In the composition system of the present invention, this component is also effective for preventing devitrification during reheat press molding. If the amount of this component is excessive, resistance to devitrification is sharply deteriorated. Therefore, the upper limit of this component is preferably 15%, more preferably 13% and most preferably 11%. Since $Li_2O$ is an optional component, the glass of the present invention can be produced without this component. For performing the above described effects of this component sufficiently, however, the lower limit of this component is preferably more than 0%, more preferably 0.1% and most preferably 1%.

$Li_2O$ may be introduced into the glass by using, e.g., $Li_2O$ or its carbonate, nitrate or hydroxide as a raw material.

$Na_2O$ is effective for decreasing glass transition temperature (Tg) and for enhancing melting of mixed glass raw materials. If the amount of this component is excessive, resistance to devitrification is sharply deteriorated. Therefore, the upper limit of this component is preferably 20%, more preferably 15% and most preferably 13%. Since $Na_2O$ is an optional component, the glass of the present invention can be produced without this component. For performing the above described effects of this component sufficiently, however, the lower limit of this component is preferably more than 0%, more preferably 0.1% and most preferably 4%.

$Na_2O$ may be introduced into the glass by using, e.g., $Na_2O$ or its carbonate, nitrate or hydroxide as a raw material.

$K_2O$ is effective for decreasing glass transition temperature (Tg) and for enhancing melting of mixed glass raw materials. If the amount of this component is excessive, resistance to devitrification is sharply deteriorated. In the composition system of the present invention, resistance to devitrification during reheat press molding is sharply deteriorated. Therefore, the upper limit of this component is preferably less than 2%, more preferably 1.5% and most preferably 1%.

$K_2O$ may be introduced into the glass by using, e.g., $K_2O$ or its carbonate, nitrate or hydroxide as a raw material.

$Bi_2O_3$ is effective for increasing refractive index and decreasing glass transition temperature (Tg). If the amount of this component is excessive, resistance to devitrification is deteriorated and partial dispersion ratio is increased. Therefore, the upper limit of this component is preferably 10%, more preferably 5% and most preferably 3%.

$Bi_2O_3$ may be introduced into the glass by using, e.g., $Bi_2O_3$ as a raw material.

$TeO_2$ is effective for increasing refractive index. However, in melting glass raw materials in a platinum crucible or in a melting bath in which a portion contacting molten glass is made of platinum, tellurium is alloyed with platinum and the alloyed portion tends to be deteriorated in heat resistance and, as a result, there is a danger that leakage of molten glass occurs in this portion. Therefore, the upper limit of the amount of this component is preferably 10%, more preferably 5% and most preferably 3%.

$TeO_2$ may be introduced into the glass by using, e.g., $TeO_2$ as a raw material.

$Ga_2O_3$ is effective for increasing refractive index. Since, however, this component is very expensive, the upper limit of the amount of this component is preferably 10%, more preferably 5% and most preferably 3%.

$Ga_2O_3$ may be introduced into the glass by using, e.g., $Ga_2O_3$ as a raw material.

$CeO_2$ is effective for improving resistance to devitrification. If the amount of this component is excessive, transmittance in the short wavelength region is deteriorated. Therefore, the upper limit of the amount of this component is preferably 10%, more preferably 5% and most preferably 3%.

$CeO_2$ may be introduced into the glass by using, e.g., $CeO_2$ as a raw material.

Raw materials which are used for introducing the respective components of the glass are cited for illustrative purpose and the raw materials are not limited to those described above. Raw materials of the glass therefore may be selected as desired from known materials according to conditions of manufacturing the glass.

The inventor of the present invention has found that a glass which has a small partial dispersion ratio ($\theta g$, F) while having the above described optical constants can be obtained by adjusting the ratio of the amount of $TiO_2$ to the total amount of $ZrO_2$ and $Nb_2O_3$ to a defined range. Namely, the ratio of $TiO_2/(ZrO_2+Nb_2O_5)$ should be preferably less than 0.32, more preferably 0.2 and most preferably 0.15.

The inventor of the present invention has found that a high refractive index, high dispersion glass which has a small partial dispersion ratio and can prevent devitrification during reheat press molding can be obtained by adjusting a total amount of $SiO_2$, $B_2O_3$, $TiO_2$, $ZrO_2$, $Nb_2O_5$, $WO_3$, ZnO, SrO, $Li_2O$ and $Na_2O$. Namely, the lower limit of the total amount of $SiO_2$, $B_2O_3$, $TiO_2$, $ZrO_2$, $Nb_2O_5$, $WO_3$, ZnO, SrO, $Li_2O$ and $Na_2O$ is preferably more than 90%, more preferably 91% and most preferably 94%.

For obtaining a glass which has desired optical constants and a small partial dispersion ratio ($\theta g$, F) and is not expensive, it is desirable that both the ratio of $TiO_2/(ZrO_2+Nb_2O_5)$ and the total amount of $SiO_2$, $B_2O_3$, $TiO_2$, $ZrO_2$, $Nb_2O_5$, $WO_3$, ZnO, SrO, $Li_2O$ and $Na_2O$ should be within the above described preferable ranges.

$Lu_2O_3$, $SnO_2$ and BeO may be added to the glass of the present invention. Since, however, $Lu_2O_3$ is an expensive material, the manufacturing cost becomes high if this component is added and, therefore, it is not practical to use this component. $SnO_2$ has the disadvantage that, in melting glass raw materials in a platinum crucible or in a melting bath in which a portion contacting molten glass is made of platinum, tin is alloyed with platinum and the alloyed portion tends to be deteriorated in heat resistance and, as a result, there is a danger that leakage of molten glass occurs in this portion. BeO has a harmful influence to the environment and therefore imposes a heavy burden to the environment. Therefore, the upper limit of the amount of each of these components should be less than 0.1%, more preferably 0.05% and most preferably, these components should not be added at all.

Components which should not be added to the optical glass of the present invention will now be described.

A lead compound has the problem that an environmental step is necessary not only in manufacture of the glass but also in cold processing of the glass such as polishing and disposal of the glass and therefore imposes a heavy burden to the environment. This component therefore should not be added to the optical glass of the present invention.

$As_2O_3$, cadmium and thorium have a harmful influence to the environmental and therefore impose a heavy burden to the environment. These components therefore should not be added to the optical glass of the present invention.

The optical glass of the present invention should preferably not comprise coloring components such as V, Cr, Mn, Fe, Co, Ni, Cu, Mo, Eu, Nd, Sm, Tb, Dy and Er. The term "should not comprise" herein means that these components should not be intentionally added and does not mean that the glass comprises trace of these components as mixed impurities.

In the present specification, amounts of the respective components expressed "on oxide basis" mean, assuming that oxides, complex salts, metal fluoride etc. used as raw materials of the glass components have all been decomposed and converted to oxides during melting of the raw materials, ratios of amounts in mass % of the oxides thus produced to the amount of the entire glass composition. In the case of a fluoride, it means an amount in mass % of the mass of F atoms actually contained to the mass of the oxide produced.

The glass composition of the present invention is expressed in mass % and cannot be converted directly to mol %. Respective components existing in the glass composition satisfying the properties required in the present invention can be expressed in mol % on oxide basis as follows:

| | |
|---|---|
| $SiO_2$ | 20-50% |
| $Nb_2O_5$ | 10-30% or below |
| and | |
| $B_2O_3$ | 0-20% and/or |
| $GeO_2$ | 0-10% and/or |
| $Al_2O_3$ | 0-10% and/or |
| $TiO_2$ | 0-15% and/or |
| $ZrO_2$ | 0-15% and/or |
| $WO_3$ | 0-10% and/or |
| ZnO | 0-10% and/or |
| SrO | 0-10% and/or |
| $Li_2O$ | 0-40% and/or |
| $Na_2O$ | 0-30% and/or |
| $Sb_2O_3$ | 0-1%. |
| $Gd_2O_3$ | 0-10% and/or |
| $Y_2O_3$ | 0-10% and/or |
| MgO | 0-15% and/or |
| CaO | 0-15% and/or |
| BaO | 0-15% and/or |
| $Ga_2O_3$ | 0-10% and/or |
| $CeO_2$ | 0-10% and/or |
| $TeO_2$ | 0-10% and/or |
| $Bi_2O_3$ | 0-10%. |

Properties of the optical glass of the present invention will now be described.

As described above, from the standpoint of utility in optical design, the lower limit of refractive index (nd) of the optical glass of the present invention should be preferably 1.78, more preferably 1.8 and most preferably 1.82 and the upper limit of the refractive index should be preferably 1.95, more preferably 1.92 and most preferably 1.9.

From the standpoint of utility in optical design, the lower limit of Abbe number (vd) of the optical glass of the present invention should be preferably 18, more preferably 20 and most preferably 22 and the upper limit of the Abbe number should be preferably 30, more preferably 28 and most preferably 27.

From the standpoint of utility in optical design, the lower limit of partial dispersion ratio ($\theta g$, F) of the optical glass of the present invention should be preferably 0.598, more preferably 0.600 and most preferably 0.602 and the upper limit of the partial dispersion ratio should be preferably 0.620, more preferably 0.619 and most preferably 0.618.

In the optical glass of the present invention, if the glass transition point (Tg) is too high, deterioration in the mold etc. tends to occur in precision press molding as described above.

Therefore, Tg of the optical glass of the present invention should be preferably 650° C., more preferably 620° C. and most preferably 600° C.

Yield point (At) of the optical glass of the present invention should be preferably 700° C., more preferably 670° C. and most preferably 650° C.

The optical glass of the present invention can be used as a preform material for precision press molding. In the case of using the optical glass as a preform material, the manufacturing method and method of precision press molding are not particularly limited but any known manufacturing method and precision press molding method can be used. For example, a preform material may be produced directly from molten glass or, alternatively, it may be produced by cold processing glass formed to a sheet.

When a preform is produced by dripping molten glass using the optical glass of the present invention, if viscosity of molten glass is too low, striae tends to occur in the preform whereas if the viscosity is too high, cutting of glass becomes difficult due to self weight and surface tension.

Accordingly, for stable production of a product of a high quality, logarithm log η of viscosity (dPa·s) at liquidus temperature should preferably be within a range of 0.3-2.0, more preferably 0.4-1.8 and most preferably 0.5-1.6.

EXAMPLES

Examples of the present invention will now be described. The invention of course is not limited to these examples.

In Tables 1-9, compositions of Example No. 1 to No. 66 will be shown together with refractive index (nd), Abbe number (vd), partial dispersion ratio (θg, F), glass transition temperature (Tg), yield point (At) and result of devitrification test. Amounts of the respective components are expressed in mass % on oxide basis.

In Table 10, compositions of Comparative Example No. A to No. C will be shown together with refractive index (nd), Abbe number (vd), partial dispersion ratio (θg, F), glass transition temperature (Tg), yield point (At) and result of devitrification test. Amounts of the respective components are expressed in mass % on oxide basis.

TABLE 1

| Example No. | 1 | 2 | 3 | 4 | 5 | 6 | 7 | 8 |
|---|---|---|---|---|---|---|---|---|
| $SiO_2$ | 26.00 | 21.00 | 26.00 | 26.00 | 24.53 | 24.76 | 24.76 | 25.49 |
| $B_2O_3$ | 0.00 | 5.00 | 0.00 | 0.00 | 2.83 | 0.00 | 0.00 | 0.00 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 2.83 | 0.00 | 0.00 | 0.00 |
| $TiO_2$ | 7.00 | 7.00 | 7.00 | 7.00 | 6.60 | 6.67 | 6.67 | 6.86 |
| $ZrO_2$ | 0.00 | 0.00 | 0.00 | 0.00 | 0.00 | 0.00 | 0.00 | 3.92 |
| $Nb_2O_5$ | 51.90 | 51.90 | 51.90 | 51.90 | 48.96 | 49.43 | 49.43 | 48.92 |
| $WO_3$ | 0.00 | 0.00 | 0.00 | 0.00 | 0.00 | 0.00 | 0.00 | 0.00 |
| ZnO | 0.00 | 0.00 | 0.00 | 0.00 | 0.00 | 4.76 | 0.00 | 0.00 |
| MgO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 4.76 | 0.00 |
| $Li_2O$ | 5.00 | 5.00 | 8.00 | 10.00 | 4.72 | 4.76 | 4.76 | 4.90 |
| $Na_2O$ | 10.00 | 10.00 | 7.00 | 5.00 | 9.43 | 9.52 | 9.52 | 9.80 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.10 | 0.10 | 0.10 | 0.10 | 0.09 | 0.10 | 0.10 | 0.10 |
| Total | 100 | 100 | 100 | 100 | 100 | 100 | 100 | 100 |
| nd | 1.84971 | 1.85377 | 1.85106 | 1.85114 | 1.84021 | 1.85097 | 1.84932 | 1.85035 |
| vd | 24.6 | 24.3 | 25.3 | 25.7 | 25.3 | 24.9 | 25.1 | 24.9 |
| θg, F | 0.6132 | 0.6142 | 0.6105 | 0.6086 | 0.6107 | 0.6119 | 0.6114 | 0.6113 |
| Tg (° C.) | | | | | | | | |
| At (° C.) | | | | | | | | |
| $TiO_2/(ZrO_2 + Nb_2O_5)$ | 0.13 | 0.13 | 0.13 | 0.13 | 0.13 | 0.13 | 0.13 | 0.13 |
| $SiO_2, B_2O_3, TiO_2, ZrO_2, Nb_2O_5, WO_3, ZnO, SrO, Li_2O, Na_2O$ Total amount (%) | 99.90 | 99.90 | 99.90 | 99.90 | 97.08 | 99.90 | 99.90 | 99.90 |
| Devitrification test (600° C.) | | | | | | | | |

TABLE 2

| Example No. | 9 | 10 | 11 | 12 | 13 | 14 | 15 | 16 |
|---|---|---|---|---|---|---|---|---|
| $SiO_2$ | 25.00 | 24.53 | 25.24 | 25.24 | 24.53 | 23.64 | 24.76 | 25.24 |
| $B_2O_3$ | 0.00 | 2.83 | 0.00 | 0.00 | 0.00 | 0.00 | 0.00 | 0.00 |
| $GeO_2$ | 0.00 | 0.00 | 0.00 | 0.00 | 0.00 | 0.00 | 0.00 | 2.91 |
| $Al_2O_3$ | 0.00 | 0.00 | 2.91 | 0.00 | 0.00 | 0.00 | 0.00 | 0.00 |
| $Gd_2O_3$ | 0.00 | 2.83 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 6.73 | 6.60 | 6.80 | 6.80 | 6.60 | 6.36 | 6.67 | 6.80 |
| $ZrO_2$ | 7.69 | 0.00 | 0.00 | 0.00 | 0.00 | 0.00 | 0.00 | 0.00 |
| $Nb_2O_5$ | 46.06 | 48.96 | 50.39 | 50.39 | 48.96 | 47.18 | 49.43 | 50.39 |

TABLE 2-continued

| Example No. | 9 | 10 | 11 | 12 | 13 | 14 | 15 | 16 |
|---|---|---|---|---|---|---|---|---|
| $WO_3$ | 0.00 | 0.00 | 0.00 | 2.91 | 5.66 | 9.09 | 0.00 | 0.00 |
| ZnO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 4.76 | 0.00 |
| SrO | 0.00 | 0.00 | 0.00 | 0.00 | 0.00 | 0.00 | 0.00 | 0.00 |
| $Li_2O$ | 4.81 | 4.72 | 4.85 | 4.85 | 4.72 | 4.55 | 4.76 | 4.85 |
| $Na_2O$ | 9.62 | 9.43 | 9.71 | 9.71 | 9.43 | 9.09 | 9.52 | 9.71 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.10 | 0.09 | 0.10 | 0.10 | 0.09 | 0.09 | 0.10 | 0.10 |
| Total | 100 | 100 | 100 | 100 | 100 | 100 | 100 | 100 |
| nd | 1.85095 | 1.83968 | 1.83150 | 1.85027 | 1.85213 | 1.85483 | 1.83528 | 1.84425 |
| νd | 25.3 | 25.2 | 25.1 | 24.5 | 24.4 | 24.3 | 25.9 | 24.8 |
| θg, F | 0.6093 | 0.6126 | 0.6116 | 0.6135 | 0.6142 | 0.6150 | 0.6078 | 0.6126 |
| Tg (° C.) | | | | | | | | |
| At (° C.) | | | | | | | | |
| $TiO_2/(ZrO_2 + Nb_2O_5)$ | 0.13 | 0.13 | 0.13 | 0.13 | 0.13 | 0.13 | 0.13 | 0.13 |
| $SiO_2$, $B_2O_3$, $TiO_2$, $ZrO_2$, $Nb_2O_5$, $WO_3$, ZnO, SrO, $Li_2O$, $Na_2O$ Total amount (%) | 99.90 | 97.08 | 96.99 | 99.90 | 99.91 | 99.91 | 95.14 | 96.99 |
| Devitrification test (600° C.) | | | | | | | | |

TABLE 3

| Example No. | 17 | 18 | 19 | 20 | 21 | 22 | 23 | 24 |
|---|---|---|---|---|---|---|---|---|
| $SiO_2$ | 25.24 | 25.24 | 25.24 | 25.24 | 25.24 | 28.16 | 25.24 | 24.76 |
| $B_2O_3$ | 0.00 | 0.00 | 0.00 | 0.00 | 0.00 | 0.00 | 2.91 | 0.00 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 6.80 | 6.80 | 6.80 | 6.80 | 6.80 | 6.80 | 6.80 | 6.67 |
| $ZrO_2$ | 0.00 | 0.00 | 0.00 | 0.00 | 2.91 | 0.00 | 0.00 | 10.48 |
| $Nb_2O_5$ | 50.39 | 50.39 | 50.39 | 53.30 | 50.39 | 50.39 | 50.39 | 43.71 |
| $WO_3$ | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| $Li_2O$ | 4.85 | 4.85 | 4.85 | 4.85 | 4.85 | 4.85 | 4.85 | 4.76 |
| $Na_2O$ | 9.71 | 9.71 | 9.71 | 9.71 | 9.71 | 9.71 | 9.71 | 9.52 |
| $K_2O$ | 0.00 | 0.00 | 0.00 | 0.00 | 0.00 | 0.00 | 0.00 | 0.00 |
| $Ga_2O_3$ | 2.91 | 0.00 | 0.00 | 0.00 | 0.00 | 0.00 | 0.00 | 0.00 |
| $CeO_2$ | 0.00 | 2.91 | 0.00 | 0.00 | 0.00 | 0.00 | 0.00 | 0.00 |
| $TeO_2$ | 0.00 | 0.00 | 2.91 | 0.00 | 0.00 | 0.00 | 0.00 | 0.00 |
| $Sb_2O_3$ | 0.10 | 0.10 | 0.10 | 0.10 | 0.10 | 0.10 | 0.10 | 0.10 |
| Total | 100 | 100 | 100 | 100 | 100 | 100 | 100 | 100 |
| nd | 1.84380 | 1.84839 | 1.84626 | 1.85785 | 1.85345 | 1.83562 | 1.83926 | 1.84961 |
| νd | 24.8 | 24.7 | 24.6 | 24.2 | 24.7 | 25.1 | 24.9 | 25.7 |
| θg, F | 0.6124 | 0.6127 | 0.6137 | 0.6146 | 0.6120 | 0.6114 | 0.6123 | 0.6080 |
| Tg (° C.) | | | | | | | | |
| At (° C.) | | | | | | | | |
| $TiO_2/(ZrO_2 + Nb_2O_5)$ | 0.13 | 0.13 | 0.13 | 0.13 | 0.13 | 0.13 | 0.13 | 0.12 |
| $SiO_2$, $B_2O_3$, $TiO_2$, $ZrO_2$, $Nb_2O_5$, $WO_3$, ZnO, SrO, $Li_2O$, $Na_2O$ Total amount (%) | 96.99 | 96.99 | 96.99 | 99.90 | 99.90 | 99.90 | 99.90 | 99.90 |
| Devitrification test (600° C.) | | | | | | | | |

TABLE 4

| Example No. | 25 | 26 | 27 | 28 | 29 | 30 | 31 | 32 |
|---|---|---|---|---|---|---|---|---|
| $SiO_2$ | 24.76 | 24.53 | 25.00 | 25.24 | 24.76 | 15.24 | 25.00 | 25.24 |
| $B_2O_3$ | 0.00 | 0.00 | 0.00 | 0.00 | 0.00 | 9.52 | 0.00 | 0.00 |

TABLE 4-continued

| Example No. | 25 | 26 | 27 | 28 | 29 | 30 | 31 | 32 |
|---|---|---|---|---|---|---|---|---|
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 6.67 | 6.60 | 5.77 | 4.85 | 5.71 | 5.71 | 6.73 | 6.80 |
| $ZrO_2$ | 8.57 | 9.43 | 8.65 | 8.74 | 8.57 | 8.57 | 9.62 | 9.71 |
| $Nb_2O_5$ | 45.62 | 45.19 | 46.06 | 46.50 | 46.57 | 46.57 | 46.06 | 46.50 |
| $WO_3$ | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| $Li_2O$ | 4.76 | 4.72 | 4.81 | 4.85 | 4.76 | 4.76 | 2.88 | 4.85 |
| $Na_2O$ | 9.52 | 9.43 | 9.62 | 9.71 | 9.52 | 9.52 | 9.62 | 6.80 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.10 | 0.09 | 0.10 | 0.10 | 0.10 | 0.10 | 0.10 | 0.10 |
| Total | 100 | 100 | 100 | 100 | 100 | 100 | 100 | 100 |
| nd | 1.85253 | 1.85416 | 1.84754 | 1.84266 | 1.85077 | 1.85381 | 1.86244 | 1.87031 |
| νd | 25.3 | 25.4 | 25.6 | 25.9 | 25.5 | 25.2 | 24.5 | 24.7 |
| θg, F | | 0.6089 | 0.6079 | 0.6056 | 0.6080 | 0.6095 | 0.6124 | 0.6117 |
| Tg (° C.) | | | | | 561 | | 587 | 574 |
| At (° C.) | | | | | 605 | | 630 | 619 |
| $TiO_2/(ZrO_2 + Nb_2O_5)$ | 0.12 | 0.12 | 0.11 | 0.09 | 0.10 | 0.10 | 0.12 | 0.12 |
| $SiO_2, B_2O_3, TiO_2,$ $ZrO_2, Nb_2O_5,$ $WO_3, ZnO, SrO,$ $Li_2O, Na_2O$ Total amount (%) | 99.90 | 99.91 | 99.90 | 99.90 | 99.90 | 99.90 | 99.90 | 99.90 |
| Devitrification test (600° C.) | | | | | | | | |

TABLE 5

| Example No. | 33 | 34 | 35 | 36 | 37 | 38 | 39 | 40 |
|---|---|---|---|---|---|---|---|---|
| $SiO_2$ | 14.95 | 15.53 | 24.88 | 15.24 | 15.53 | 15.53 | 15.09 | 14.41 |
| $B_2O_3$ | 9.35 | 9.71 | 0.00 | 9.52 | 9.71 | 9.71 | 9.43 | 9.01 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 5.61 | 4.85 | 4.78 | 3.81 | 1.94 | 1.94 | 0.00 | 0.00 |
| $ZrO_2$ | 10.28 | 8.74 | 8.61 | 10.48 | 10.68 | 10.68 | 10.38 | 9.91 |
| $Nb_2O_5$ | 45.70 | 46.50 | 47.27 | 46.57 | 47.48 | 47.48 | 50.85 | 53.06 |
| $WO_3$ | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| $Li_2O$ | 4.67 | 4.85 | 4.78 | 4.76 | 4.85 | 1.94 | 4.72 | 4.50 |
| $Na_2O$ | 9.35 | 9.71 | 9.57 | 9.52 | 9.71 | 12.62 | 9.43 | 9.01 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.09 | 0.10 | 0.10 | 0.10 | 0.10 | 0.10 | 0.09 | 0.09 |
| Total | 100 | 100 | 100 | 100 | 100 | 100 | 100 | 100 |
| nd | 1.85682 | 1.84556 | 1.84776 | 1.84684 | 1.83688 | 1.83318 | 1.84301 | 1.85818 |
| νd | 25.3 | 25.7 | 25.7 | 25.9 | 26.6 | 25.8 | 26.4 | 25.7 |
| θg, F | 0.6087 | 0.6073 | 0.6072 | 0.6065 | 0.6034 | 0.6058 | 0.6041 | 0.6067 |
| Tg (° C.) | 501 | | | | | 532 | | |
| At (° C.) | 547 | | | | | 573 | | |
| $TiO_2/(ZrO_2 + Nb_2O_5)$ | 0.10 | 0.09 | 0.09 | 0.07 | 0.03 | 0.03 | 0.00 | 0.00 |
| $SiO_2, B_2O_3, TiO_2,$ $ZrO_2, Nb_2O_5,$ $WO_3, ZnO, SrO,$ $Li_2O, Na_2O$ Total amount (%) | 99.91 | 99.90 | 99.90 | 99.90 | 99.90 | 99.90 | 99.91 | 99.91 |
| Devitrification test (600° C.) | | | | | | | | |

TABLE 6

| Example No. | 41 | 42 | 43 | 44 | 45 | 46 | 47 | 48 |
|---|---|---|---|---|---|---|---|---|
| $SiO_2$ | 14.95 | 24.53 | 24.07 | 15.24 | 15.24 | 15.09 | 15.24 | 14.61 |
| $B_2O_3$ | 9.35 | 0.00 | 0.00 | 9.52 | 9.52 | 9.43 | 9.52 | 9.13 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 5.61 | 6.60 | 6.48 | 5.71 | 5.71 | 6.60 | 5.71 | 7.76 |
| $ZrO_2$ | 10.28 | 0.00 | 0.00 | 8.57 | 8.57 | 0.00 | 0.00 | 10.05 |
| $Nb_2O_5$ | 45.70 | 54.62 | 55.46 | 46.57 | 46.57 | 54.62 | 55.14 | 44.66 |
| $WO_3$ | 0.00 | 0.00 | 0.00 | 0.00 | 0.00 | 0.00 | 0.00 | 0.00 |
| $ZnO$ | 0.00 | 0.00 | 0.00 | 0.00 | 0.00 | 0.00 | 0.00 | 0.00 |
| $MgO$ | 0.00 | 0.00 | 0.00 | 0.00 | 0.00 | 0.00 | 0.00 | 0.00 |
| $SrO$ | 0.00 | 0.00 | 0.00 | 0.00 | 0.00 | 0.00 | 0.00 | 0.00 |
| $Li_2O$ | 1.87 | 4.72 | 4.63 | 4.76 | 4.76 | 4.72 | 4.76 | 1.83 |
| $Na_2O$ | 12.15 | 9.43 | 9.26 | 9.52 | 9.52 | 9.43 | 9.52 | 11.87 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.09 | 0.09 | 0.09 | 0.10 | 0.10 | 0.09 | 0.10 | 0.09 |
| Total | 100 | 100 | 100 | 100 | 100 | 100 | 100 | 100 |
| nd | 1.85245 | 1.86874 | 1.87448 | 1.84286 | 1.85303 | 1.87293 | 1.86829 | 1.86405 |
| νd | 24.6 | 23.8 | 23.6 | 25.6 | 25.3 | 23.5 | 23.7 | 24.0 |
| θg, F | 0.6112 | 0.6156 | 0.6166 | 0.6084 | 0.6093 | 0.6175 | 0.6159 | 0.6147 |
| Tg (° C.) | | | | | | | | |
| At (° C.) | | | | | | | | |
| $TiO_2/(ZrO_2 + Nb_2O_5)$ | 0.10 | 0.12 | 0.12 | 0.10 | 0.10 | 0.12 | 0.10 | 0.14 |
| $SiO_2$, $B_2O_3$, $TiO_2$, $ZrO_2$, $Nb_2O_5$, $WO_3$, $ZnO$, $SrO$, $Li_2O$, $Na_2O$ Total amount (%) | 99.91 | 99.91 | 99.91 | 99.90 | 99.90 | 99.91 | 99.90 | 99.91 |
| Devitrification test (600° C.) | | | | | | | | |

TABLE 7

| Example No. | 49 | 50 | 51 | 52 | 53 | 54 | 55 | 56 |
|---|---|---|---|---|---|---|---|---|
| $SiO_2$ | 14.16 | 24.07 | 23.85 | 24.07 | 23.85 | 14.47 | 14.31 | 23.42 |
| $B_2O_3$ | 8.85 | 0.00 | 0.00 | 0.00 | 0.00 | 9.04 | 8.94 | 0.00 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 5.31 | 6.48 | 6.42 | 6.48 | 6.42 | 6.87 | 6.08 | 6.31 |
| $ZrO_2$ | 9.73 | 1.85 | 2.75 | 1.85 | 2.75 | 9.95 | 9.84 | 4.50 |
| $Nb_2O_5$ | 48.58 | 53.61 | 53.12 | 53.61 | 53.12 | 46.02 | 47.32 | 52.16 |
| $WO_3$ | 0.00 | 0.00 | 0.00 | 0.00 | 0.00 | 0.00 | 0.00 | 0.00 |
| $ZnO$ | 0.00 | 0.00 | 0.00 | 0.00 | 0.00 | 0.00 | 0.00 | 0.00 |
| $MgO$ | 0.00 | 0.00 | 0.00 | 0.00 | 0.00 | 0.00 | 0.00 | 0.00 |
| $SrO$ | 0.00 | 0.00 | 0.00 | 0.00 | 0.00 | 0.00 | 0.00 | 0.00 |
| $Li_2O$ | 1.77 | 4.63 | 4.59 | 1.85 | 1.83 | 1.81 | 1.79 | 1.80 |
| $Na_2O$ | 11.50 | 9.26 | 9.17 | 12.04 | 11.93 | 11.75 | 11.63 | 11.71 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.09 | 0.09 | 0.09 | 0.09 | 0.09 | 0.09 | 0.09 | 0.09 |
| Total | 100 | 100 | 100 | 100 | 100 | 100 | 100 | 100 |
| nd | 1.87040 | 1.87183 | 1.87332 | 1.86873 | 1.87012 | 1.86589 | 1.86815 | 1.87275 |
| νd | 23.9 | 23.9 | 23.9 | 23.2 | 23.3 | 24.0 | 24.0 | 23.3 |
| θg, F | 0.6143 | 0.6152 | 0.6146 | 0.6187 | 0.6176 | 0.6141 | 0.6143 | 0.6170 |
| Tg (° C.) | | | | | | | | |
| At (° C.) | | | | | | | | |
| $TiO_2/(ZrO_2 + Nb_2O_5)$ | 0.09 | 0.12 | 0.11 | 0.12 | 0.11 | 0.12 | 0.11 | 0.11 |
| $SiO_2$, $B_2O_3$, $TiO_2$, $ZrO_2$, $Nb_2O_5$, $WO_3$, $ZnO$, $SrO$, $Li_2O$, $Na_2O$ Total amount (%) | 99.91 | 99.91 | 99.91 | 99.91 | 99.91 | 99.91 | 99.91 | 99.91 |
| Devitrification test (600° C.) | | | | | | | | |

TABLE 8

| Example No. | 57 | 58 | 59 | 60 | 61 | 62 | 63 | 64 |
|---|---|---|---|---|---|---|---|---|
| $SiO_2$ | 23.21 | 15.38 | 15.31 | 14.95 | 14.81 | 22.81 | 22.41 | 23.21 |
| $B_2O_3$ | 0.00 | 9.62 | 9.57 | 9.35 | 9.26 | 0.00 | 0.00 | 0.00 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $TiO_2$ | 6.25 | 4.81 | 5.26 | 5.61 | 5.56 | 6.14 | 6.03 | 6.25 |
| $ZrO_2$ | 5.36 | 0.00 | 0.00 | 1.87 | 2.78 | 7.02 | 8.62 | 5.36 |
| $Nb_2O_5$ | 51.70 | 55.67 | 55.41 | 54.11 | 53.61 | 50.79 | 49.91 | 51.70 |
| $WO_3$ | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| $Li_2O$ | 1.79 | 4.81 | 4.78 | 4.67 | 4.63 | 1.75 | 1.72 | 4.46 |
| $Na_2O$ | 11.61 | 9.62 | 9.57 | 9.35 | 9.26 | 11.40 | 11.21 | 8.93 |
| $K_2O$ | 0.00 | 0.00 | 0.00 | 0.00 | 0.00 | 0.00 | 0.00 | 0.00 |
| $Ga_2O_3$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $TeO_2$ | 0.00 | 0.00 | 0.00 | 0.00 | 0.00 | 0.00 | 0.00 | 0.00 |
| $Sb_2O_3$ | 0.09 | 0.10 | 0.10 | 0.09 | 0.09 | 0.09 | 0.09 | 0.09 |
| Total | 100 | 100 | 100 | 100 | 100 | 100 | 100 | 100 |
| nd | 1.87421 | 1.86304 | 1.86543 | 1.87067 | 1.87202 | 1.87685 | 1.87927 | 1.87772 |
| νd | 23.4 | 24.0 | 23.9 | 23.8 | 23.9 | 23.5 | 23.6 | 24.0 |
| θg, F | 0.6172 | 0.6158 | 0.6164 | 0.6158 | 0.6150 | 0.6165 | 0.6156 | 0.6141 |
| Tg (° C.) |  |  |  |  |  |  |  | 559 |
| At (° C.) |  |  |  |  |  |  |  | 605 |
| $TiO_2/(ZrO_2 + Nb_2O_5)$ | 0.11 | 0.09 | 0.09 | 0.10 | 0.10 | 0.11 | 0.10 | 0.11 |
| $SiO_2$, $B_2O_3$, $TiO_2$, $ZrO_2$, $Nb_2O_5$, $WO_3$, ZnO, SrO, $Li_2O$, $Na_2O$ Total amount (%) | 99.91 | 99.90 | 99.90 | 99.91 | 99.91 | 99.91 | 99.91 | 99.91 |
| Devitrification test (600° C.) |  |  |  |  |  |  |  | ○ |

TABLE 9

| | Example No. | |
|---|---|---|
| | 65 | 66 |
| $SiO_2$ | 22.81 | 22.61 |
| $B_2O_3$ | 0.00 | 0.00 |
| $GeO_2$ | 0.00 | 0.00 |
| $Al_2O_3$ | 0.00 | 0.00 |
| $Gd_2O_3$ | 0.00 | 0.00 |
| $Y_2O_3$ | 0.00 | 0.00 |
| $TiO_2$ | 7.89 | 6.09 |
| $ZrO_2$ | 5.26 | 5.22 |
| $Nb_2O_5$ | 50.79 | 52.96 |
| $WO_3$ | 0.00 | 0.00 |
| ZnO | 0.00 | 0.00 |
| MgO | 0.00 | 0.00 |
| SrO | 0.00 | 0.00 |
| $Li_2O$ | 1.75 | 1.74 |
| $Na_2O$ | 11.40 | 11.30 |
| $K_2O$ | 0.00 | 0.00 |
| $Ga_2O_3$ | 0.00 | 0.00 |
| $CeO_2$ | 0.00 | 0.00 |
| $TeO_2$ | 0.00 | 0.00 |
| $Sb_2O_3$ | 0.09 | 0.09 |
| Total | 100 | 100 |
| nd | 1.88329 | 1.88267 |
| νd | 22.9 | 23.1 |
| θg, F | 0.6187 | 0.6184 |
| Tg | | |
| At | | |
| $TiO_2/(ZrO_2 + Nb_2O_5)$ | 0.14 | 0.10 |
| $SiO_2$, $B_2O_3$, $TiO_2$, $ZrO_2$, $Nb_2O_5$, $WO_3$, ZnO, SrO, $Li_2O$, $Na_2O$ Total amount(%) | 99.91 | 99.91 |
| Devitrification test (600° C.) | | |

TABLE 10

| | Example No. | | |
|---|---|---|---|
| | A | B | C |
| $SiO_2$ | 21.00 | 28.00 | 22.00 |
| $B_2O_3$ | 2.00 | 0.00 | 0.00 |
| $GeO_2$ | 0.00 | 0.00 | 0.00 |
| $Al_2O_3$ | 0.00 | 1.00 | 0.00 |
| $La_2O_3$ | 3.00 | 0.00 | 0.00 |
| $Y_2O_3$ | 0.00 | 0.00 | 0.00 |
| $TiO_2$ | 12.00 | 13.00 | 32.00 |
| $ZrO_2$ | 6.00 | 0.00 | 1.00 |
| $Nb_2O_5$ | 38.90 | 44.00 | 13.00 |
| $WO_3$ | 2.00 | 0.00 | 0.00 |
| ZnO | 0.00 | 0.00 | 0.00 |
| CaO | 2.00 | 0.00 | 0.00 |
| SrO | 0.00 | 0.00 | 0.00 |
| BaO | 4.00 | 2.00 | 17.00 |
| $Li_2O$ | 6.00 | 6.00 | 0.00 |
| $Na_2O$ | 0.00 | 0.00 | 14.95 |
| $K_2O$ | 3.00 | 6.00 | 0.00 |

TABLE 10-continued

| | Example No. | | |
|---|---|---|---|
| | A | B | C |
| $Ga_2O_3$ | 0.00 | 0.00 | 0.00 |
| $CeO_2$ | 0.00 | 0.00 | 0.00 |
| $TeO_2$ | 0.00 | 0.00 | 0.00 |
| $Sb_2O_3$ | 0.10 | 0.00 | 0.05 |
| Total | 100.00 | 100.00 | 100.00 |
| nd | 1.89733 | 1.84093 | 1.84725 |
| vd | 24.4 | 24.1 | 23.8 |
| θg, F | 0.6143 | 0.6180 | 0.6201 |
| Tg | 552 | 550 | 588 |
| At | 601 | 593 | 628 |
| $TiO_2/(ZrO_2 + Nb_2O_5)$ | 0.27 | 0.30 | 2.29 |
| $SiO_2$, $B_2O_3$, $TiO_2$, $ZrO_2$, $Nb_2O_5$, $WO_3$, ZnO, SrO, $Li_2O$, $Na_2O$ Total amount (%) | 87.90 | 91.00 | 82.95 |
| Devitrification test 690° C. | | | ○ |
| Devitrification test 660° C. | X | X | ○ |

For producing Examples No. 1 to No. 66 of the optical glass of the present invention shown in Tables 1-9, optical glass raw materials such as oxides, hydroxides, carbonates and nitrates were weighed at the composition ratios of the respective Examples and mixed together and then were put in a platinum crucible. The raw materials were melted at 1100° C. to 1400° C. for 3 hours to 5 hours according to melting property of the materials of the respective compositions and then refined and stirred for homogenization. Then, the molten glass was cast in a mold and annealed to products.

Refractive index (nd) and Abbe number (vd) were measured with respect to the optical glasses which were obtained by using annealing temperature falling speed of −25° C./hour.

For calculating partial dispersion ratio (θg, F), refractive index (nC) at C line (wavelength of 656.27 nm), refractive index (nF) at F line (wavelength of 486.13 nm) and refractive index (ng) at g line (wavelength of 435.835 nm) were measured with respect to the optical glasses obtained by using annealing temperature falling speed of −25° C./hour and the partial dispersion ratio was calculated by using the formula θg, F=(ng−nF)/(nF−nC).

Glass transition temperature (Tg) was measured by using the method described in Japan Optical Glass Industry Standard JOGIS08$^{-2003}$ (Measuring method of thermal expansion of optical glass). As a test piece, a specimen having length of 50 mm and diameter of 4 mm was used.

Yield point (At) was measured by using a measuring method similar to the measuring method of glass transition temperature (Tg) and a temperature at which the glass ceased to stretch and started to shrink was determined as yield point.

For conducting the devitrification test, a piece of glass obtained by cutting glass gob to a size of 10-40 mm was used as a test piece. The test piece was put in an electric furnace and temperature of the electric furnace was raised to a predetermined temperature for 1 hour to 3 hours and the test piece was held at the predetermined temperature for 30 minutes and cooled in the electric furnace. Then, the glass piece was polished on both surfaces and devitrification in the test piece was observed with eye and by a microscope. As a result of the observation, a test piece in which devitrification was not observed was marked with ○ and a test piece in which devitrification was observed was marked with X.

As will be noted from Tables 1-9, the Example No. 1 to No. 66 of the optical glass of the present invention all have optical constants (refractive index and Abbe number) within the above described ranges, have partial dispersion ratio (θg, F) of 0.620 or below, and have no devitrification in the glass by the devitrification test at 660° C. Further, since glass transition temperature (Tg) of these Examples is 650° C. or below, they are suitable for precision press molding.

In contrast, glasses were produced with respect to the glass compositions of Comparative Example No. A to No. C shown in Table 10 by employing the same conditions as in the Examples and the produced glasses were assessed by the same method as in the Examples. As will be noted from Table 10, the Comparative Examples No. A and B have devitrification by the devitrification test because they have $K_2O$ in an amount which is out of the range of less than 2%. In Comparative Example C, since $TiO_2/(ZrO_2+Nb_2O_5)$ is out of the range of less than 0.32, and the total amount of $SiO_2$, $B_2O_3$, $TiO_2$, $ZrO_2$, $Nb_2O_5$, $WO_3$, ZnO, SrO, $Li_2O$ and $Na_2O$ is out of the range of more than 90%, partial dispersion ratio (θg, F) does not satisfy the value of 0.620 or below. Therefore, the glasses of the Comparative Examples cannot be used for industrial purposes.

INDUSTRIAL UTILITY

As described in the foregoing, since the optical glass of the present invention is of a $SiO_2$—$Nb_2O_5$ system, comprises $Nb_2O_5$ in an amount of more than 40% in mass %, has refractive index (nd) of 1.78 or over and Abbe number (vd) of 30 or below, and has partial dispersion ratio of 0.620 or below, it is very useful in optical design. Further, since the optical glass has glass transition temperature (Tg) of 650° C. or below, it is suitable for precision press molding. Thus, the optical glass of the present invention is very useful for industrial purposes.

What is claimed is:

1. An optical glass having optical constants of a refractive index (nd) of 1.78 or over, an Abbe number (vd) of 27 or below, and a partial dispersion ratio (θg, F) of 0.620 or below, and comprising $SiO_2$ of 10% or over and 40% or below, and $Nb_2O_5$ of more than 40% and 65% or below, and $ZrO_2$ of 1% or over and 15% or below in ratios of amounts in mass % on oxide basis as essential components, wherein an amount of $B_2O_3$ is 5.00% or below, $TiO_2/(ZrO_2+Nb_2O_5)$ is 0.2 or below, and a total amount of $SiO_2$, $B_2O_3$, $TiO_2$, $ZrO_2$, $Nb_2O_5$, $WO_3$, ZnO, SrO, $Li_2O$ and $Na_2O$ is more than 90%.

2. The optical glass as defined in claim 1 further comprising, in mass % on oxide basis, less than 2% of $K_2O$.

3. The optical glass as defined in claim 1 comprising, in mass % on oxide basis:

| | |
|---|---|
| $GeO_2$ | 0-5%, |
| $Al_2O_3$ | 0-5%, |
| $TiO_2$ | 0-15%, |
| $WO_3$ | 0-15%, |
| ZnO | 0-15%, |
| SrO | 0-15%, |
| $Li_2O$ | 0-15%, |
| $Na_2O$ | 0-20%, and |
| $Sb_2O_5$ | 0-1%. |

4. The optical glass as defined in claim 1, further comprising one or more materials, in mass % on oxide basis:

| | |
|---|---|
| $Gd_2O_3$ | 0-5%, |
| $Y_2O_3$ | 0-5%, |
| MgO | 0-5%, |

-continued

|     |           |
| --- | --------- |
| CaO | 0-5%,     |
| BaO | 0-5%,     |
| $Ga_2O_3$ | 0-5%, |
| $CeO_2$ | 0-5%,   |
| $TeO_2$ | 0-5%, and |
| $Bi_2O_3$ | 0-5%. |

5. The optical glass as defined in claim 3, further comprising one or more materials, in mass % on oxide basis:

|     |           |
| --- | --------- |
| $Gd_2O_3$ | 0-5%, |
| $Y_2O_3$  | 0-5%, |
| MgO | 0-5%,     |
| CaO | 0-5%,     |
| BaO | 0-5%,     |
| $Ga_2O_3$ | 0-5%, |
| $CeO_2$ | 0-5%,   |
| $TeO_2$ | 0-5%, and |
| $Bi_2O_3$ | 0-5%. |

6. The optical glass as defined in claim 1 having a glass transition point (Tg) of 650° C. or below.

7. The optical glass as defined in claim 1, wherein the optical glass is a lens preform.

8. The optical glass as defined in claim 1, wherein the optical glass is a lens preform for press molding.

9. The optical glass as defined in claim 1, wherein the optical glass is included in an optical element.

* * * * *